(12) United States Patent
Morelli, Jr.

(10) Patent No.: US 9,665,700 B2
(45) Date of Patent: May 30, 2017

(54) SYSTEMS AND METHODS OF MANAGING ACCESS TO REMOTE RESOURCES

(71) Applicant: Sphere 3D Inc., Mississauga (CA)

(72) Inventor: Giovanni Morelli, Jr., Toronto (CA)

(73) Assignee: SPHERE 3D INC., Mississauga, Ontario (CA)

(*) Notice: Subject to any disclaimer, the term of this patent is extended or adjusted under 35 U.S.C. 154(b) by 76 days.

(21) Appl. No.: 13/742,585

(22) Filed: Jan. 16, 2013

(65) Prior Publication Data

US 2013/0185774 A1    Jul. 18, 2013

(30) Foreign Application Priority Data

Jan. 16, 2012    (CA) .................................. 2764283

(51) Int. Cl.
*G06F 7/04*    (2006.01)
*G06F 15/16*    (2006.01)
(Continued)

(52) U.S. Cl.
CPC .......... *G06F 21/31* (2013.01); *G06F 21/6218* (2013.01); *G06F 2221/2137* (2013.01)

(58) Field of Classification Search
CPC ..... G06F 21/31; G06F 21/6218; H04L 41/28; H04L 12/2461
(Continued)

(56) References Cited

U.S. PATENT DOCUMENTS 5,341,477 A    8/1994    Pitkin et al.
5,748,890 A *  5/1998    Goldberg et al. ............ 726/2
(Continued)

FOREIGN PATENT DOCUMENTS

EP         998705        10/1997
JP       200057091        2/2005

OTHER PUBLICATIONS

How to redirect to a certain URL if a page returns an "access denied" message? Posted by DrupalCuckoo on Jul. 12, 2010 at 10:39am https://groups.drupal.org/node/80154.*
(Continued)

*Primary Examiner* — Michael R Vaughan
*Assistant Examiner* — Vadim Savenkov
(74) *Attorney, Agent, or Firm* — Bereskin & Parr LLP/S.E.N.C.R.L., s.r.l.; Ian C. McMillan

(57) ABSTRACT

A method and system are provided for managing access to resources available remotely from at least one computing device. The resources include at least one software application and at least one hardware component. The method and system involve storing access level indicators for indicating different types of access; storing identifiers for identifying different users with access to the at least one computing device and possible access to the resources; for each resource and each identifier, storing an access level indicator for that resource and that user; and before granting access to a resource for a user seeking access to the resource, operating a processor to: determine an identifier identifying the user; determine the access level indicator stored in the storage module for the identifier and the resource; and if access is consistent with the determined access level indicator, grant access to the resource, otherwise, deny access to the resource.

30 Claims, 3 Drawing Sheets

(51) Int. Cl.
*G06F 17/30* (2006.01)
*H04L 29/06* (2006.01)
*G06F 21/31* (2013.01)
*G06F 21/62* (2013.01)

(58) Field of Classification Search
USPC ............ 726/1–2, 4, 17, 27–30; 713/182–186
See application file for complete search history.

(56) References Cited

U.S. PATENT DOCUMENTS

| | | | |
|---|---|---|---|
| 6,389,379 B1 | 5/2002 | Lin et al. | |
| 6,750,885 B1* | 6/2004 | Finch et al. | 715/777 |
| 7,007,093 B2* | 2/2006 | Spicer et al. | 726/4 |
| 7,219,234 B1* | 5/2007 | Ashland et al. | 726/4 |
| 7,434,257 B2* | 10/2008 | Garg et al. | 726/21 |
| 7,568,217 B1* | 7/2009 | Prasad et al. | 726/3 |
| 7,580,826 B2 | 8/2009 | Vega et al. | |
| 7,702,693 B1* | 4/2010 | Aiyagari | G06F 21/6218 707/781 |
| 7,870,256 B2 | 1/2011 | Talwar et al. | |
| 8,028,040 B1 | 9/2011 | Hobbs et al. | |
| 8,141,075 B1 | 3/2012 | Chawla et al. | |
| 8,175,863 B1 | 5/2012 | Ostermeyer et al. | |
| 8,347,288 B1 | 1/2013 | Brandwine | |
| 8,453,145 B1 | 5/2013 | Naik | |
| 8,555,274 B1 | 10/2013 | Chawla et al. | |
| 8,572,613 B1 | 10/2013 | Brandwine | |
| 8,707,397 B1 | 4/2014 | Wilkinson et al. | |
| 8,763,082 B2* | 6/2014 | Huber | G06Q 20/1235 380/270 |
| 2005/0132220 A1* | 6/2005 | Chang et al. | 713/201 |
| 2006/0190238 A1 | 8/2006 | Autor et al. | |
| 2007/0130305 A1 | 6/2007 | Piper et al. | |
| 2009/0007229 A1* | 1/2009 | Stokes | G06F 21/6218 726/2 |
| 2010/0269046 A1 | 10/2010 | Pahlavan et al. | |
| 2010/0299436 A1 | 11/2010 | Khalid et al. | |
| 2011/0018883 A1 | 1/2011 | Sampath et al. | |
| 2011/0055602 A1 | 3/2011 | Kamay et al. | |
| 2011/0145574 A1* | 6/2011 | Ju et al. | 726/28 |
| 2011/0153716 A1 | 6/2011 | Malakapalli et al. | |
| 2011/0246904 A1 | 10/2011 | Pinto et al. | |
| 2011/0265009 A1 | 10/2011 | Eby et al. | |
| 2012/0089980 A1 | 4/2012 | Sharp et al. | |
| 2012/0110571 A1 | 5/2012 | Smith et al. | |
| 2012/0297455 A1* | 11/2012 | Novak et al. | 726/4 |
| 2013/0055102 A1 | 2/2013 | Matthews et al. | |
| 2013/0060837 A1 | 3/2013 | Chakraborty et al. | |
| 2013/0076768 A1 | 3/2013 | Chakraborty et al. | |
| 2013/0104125 A1 | 4/2013 | Sarma et al. | |

OTHER PUBLICATIONS

Microsoft, "Remote Desktop Protocol", Retrieved from the Internet: URL: msdn.microsoft.com/en-ca/library/windows/desktop/aa383015(v=vs.85).aspx [retrieved on Apr. 8, 2013].

Microsoft, "Virtual Desktop Infrastructure", Retrieved from the Internet: URL: www.microsoft.com/en-us/server-cloud/windows-server/virtual-desktop-infrastructure.aspx [retrieved on Apr. 8, 2013].

Microsoft, "Remote Desktop Services in Windows Server 2008 R2", Retrieved from the Internet: URL: technet.microsoft.com/library/dd647502(WS.10).aspx [retrieved on Apr. 8, 2013].

Microsoft, "Microsoft Hyper-V Server 2012", Retrieved from the Internet: URL: www.microsoft.com/en-us/server-cloud/hyper-v-server/default.aspx [retrieved on Apr. 8, 2013].

Microsoft, "Virtualization Desktop Infrastructure, Windows Server 2012", Retrieved from the Internet: URL: download.microsoft.com/download/F/E/D/FED8C1A8-B146-4434-BE2E-A82CA9F26079/WS%202012%20White%20Paper_VDI.pdf [retrieved on Apr. 8, 2013].

Microsoft, "Why Hyper-V?", Retrieved from the Internet: URL: download.microsoft.com/download/5/7/8/578E035F-A1A8-4774-B404-317A7ABCF751/Competitive-Advantages-of-Hyper-V-Server-2012-over-VMware-vSphere-Hypervisor.pdf [retrieved on Apr. 8, 2013].

International Search Report and Written Opinion dated Jul. 11, 2014, International Application No. PCT/CA2014/000301.

Office Action dated Mar. 10, 2015, U.S. Appl. No. 13/742,632.

Response to Office Action dated Mar. 10, 2015, U.S. Appl. No. 13/742,632.

Office Action for U.S. Appl. No. 13/741,884. Dated Jan. 15, 2016.

\* cited by examiner

SYSTEMS AND METHODS OF MANAGING ACCESS TO REMOTE RESOURCES

This application claims foreign priority to Canadian Patent Application No. 2,764,283, filed on Jan. 16, 2012.

FIELD

The described embodiments relate to systems and methods for managing access to remote resources and in particular, for managing access to resources available remotely from at least one computing device.

BACKGROUND

Computing devices can now operate to satisfy a wide range of different purposes, such as for business and for recreation. In many business environments, computing devices are available to employees for the purpose of conducting work and perhaps even available to customers for inquiring about the business. Although businesses generally intend for these computing devices to be used for business purposes, it is possible for employees and customers to operate the computing device to conduct unrelated activities, such as for recreational purposes. As a result, employee productivity can be lowered and business resources can be improperly used. Use of the computing devices for non-business purposes during business hours can also take away resources that could otherwise be used for business purposes. Also, any activities unrelated to the business can introduce technical problems, such as computer viruses and malware, to the computing devices.

Proper management of resources available to computing devices is therefore important.

SUMMARY

In accordance with an embodiment of the invention, there is provided a method of managing access to a plurality of resources available remotely from at least one computing device. The plurality of resources includes at least one software application providing at least one computer program and at least one hardware component. The method comprises: storing, in a storage module in electronic communication with the computing device, a plurality of access level indicators for indicating a plurality of different types of access, wherein each access level indicator in the plurality of access level indicators indicates a different type of access in the plurality of different types of access, each different type of access is a type of access to at least one resource in the plurality of resources; storing in the storage module a plurality of identifiers for identifying different users having access to the at least one computing device and possible access to the plurality of resources; for each resource in the plurality of resources, and for each identifier in the plurality of identifiers, storing in the storage module an access level indicator for that resource and that user, wherein the access level indicator is selected from the plurality of access level indicators; and before granting access to a resource in the plurality of resources for a user seeking access to the resource using a computing device in the at least one computing device, operating at least one processor, the at least one processor being in electronic communication with the computing device, to: determine an identifier identifying a user seeking access to the resource; determine the access level indicator stored in the storage module for the identifier and the resource; and if access is consistent with the determined access level indicator, grant access to the resource, otherwise, deny access to the resource.

In accordance with an embodiment of the invention, there is provided a system of managing access to a plurality of resources available remotely from at least one computing device. The plurality of resources includes at least one software application providing at least one computer program and at least one hardware component. The system comprises: a control module in electronic communication with the computing device, the control module comprising a control processor and a control storage module having instructions stored thereon for configuring the control processor to: store in the control storage module a plurality of access level indicators for indicating a plurality of different types of access, wherein each access level indicator in the plurality of access level indicators indicates a different type of access in the plurality of different types of access, each different type of access is a type of access to at least one resource in the plurality of resources; store in the control storage module a plurality of identifiers for identifying different users having access to the at least one computing device and possible access to the plurality of resources; for each resource in the plurality of resources, and for each identifier in the plurality of identifiers, store in the control storage module an access level indicator for that resource and that user, wherein the access level indicator is selected from the plurality of access level indicators; before granting access to a resource in the plurality of resources for a user seeking access to the resource using a computing device in the at least one computing device, determine an identifier identifying a user seeking access to the resource; determine the access level indicator stored in the control storage module for the identifier and the resource; and if access is consistent with the determined access level indicator, grant access to the resource, otherwise, deny access to the resource.

BRIEF DESCRIPTION OF THE DRAWINGS

Several embodiments of the present invention will now be described in detail with reference to the drawings, in which.

Figure 1:
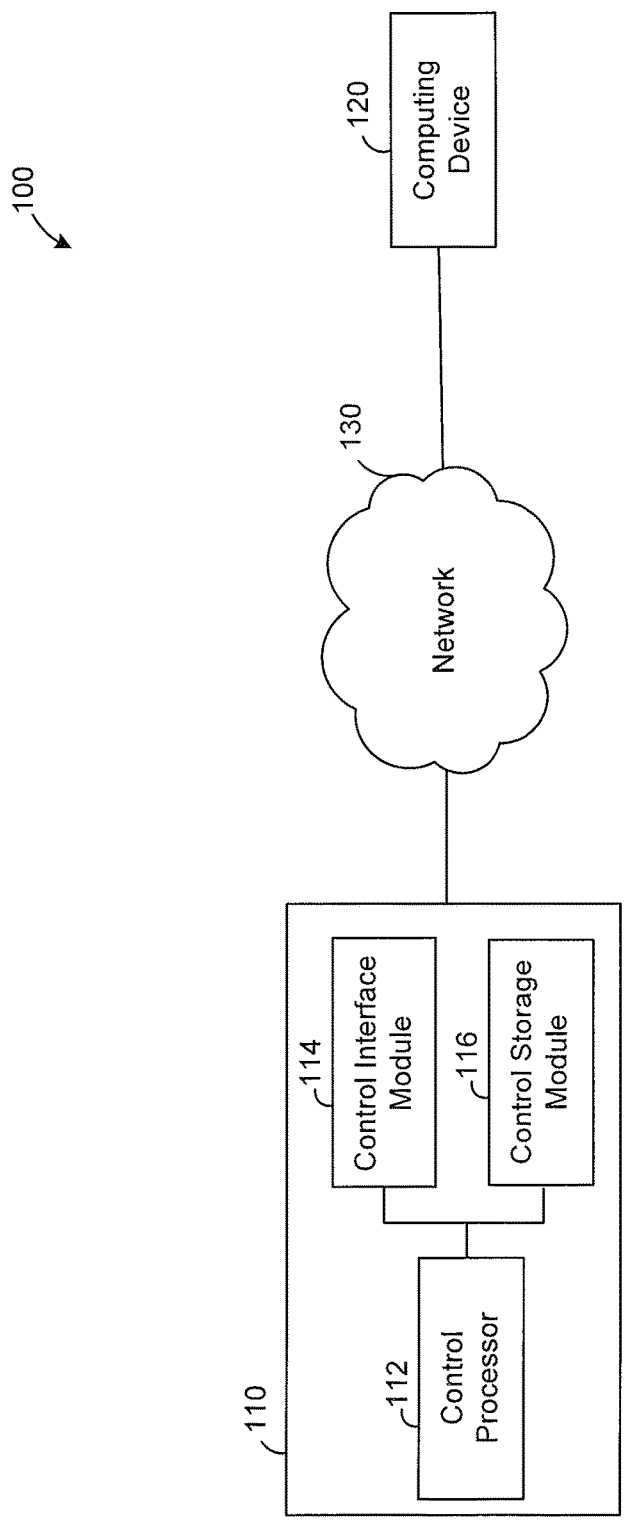
FIG. 1 is a block diagram of components interacting with a control module, in accordance with an example embodiment.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. It will be appreciated that for simplicity and clarity of illustration, where considered appropriate, reference numerals may be repeated among the figures to indicate corresponding or analogous elements or steps.

DESCRIPTION OF EXEMPLARY EMBODIMENTS

The embodiments of the systems, processes and methods described herein may be implemented in hardware or software, or a combination of both. Alternatively, these embodiments may also be implemented in computer programs executed on programmable computers each comprising at least one processor (e.g., a microprocessor), a data storage system (including volatile and non-volatile memory and/or storage elements), at least one input device, and at least one output device. For example and without limitation, the programmable computers (referred to below as computing devices) may be a personal computer, laptop, personal data assistant, cellular telephone, smart-phone device, tablet computer, and/or wireless device. For any software components, program code is applied to input data to perform the functions described herein and generate output information. The output information is applied to one or more output devices, in known fashion.

Each software component or program may be implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

The various embodiments described herein generally relate to a system (and related methods) for managing access to remote resources. In particular, the resources can be resources available remotely from at least one computing device. For each user of the at least one computing device and each resource available to the computing device, an access level indicator is stored in a storage module accessible to the computing device. The access level indicator generally indicates a type of access available to that user and for that resource. To determine if access can be granted to a user seeking access to a resource using a computing device, a control module determines an access level indicator for that user and an access level indicator for that resource. Access to that resource can be granted when the access level indicators for the user and the resource are consistent or compatible.

Reference is first made to FIG. 1, which is a block diagram 100 of components interacting with a control module 110.

As shown in FIG. 1, the control module 110 can communicate with a computing device 120 over a network 130. For example, the control module 110 can be in electronic communication with the computing device 120. For clarity, only one computing device 120 is illustrated in FIG. 1 but it will be understood that one or more computing devices 120 can communicate with the control module 110 at any given time.

The computing device 120 can generally be any electronic device capable of network communication. For example, and without limitation, the computing device 120 can be a personal computer, laptop, personal data assistant, cellular telephone, smart-phone device, tablet computer, wireless device, and/or kiosk. The computing device 120 can include one or more components or modules that operate based on software and/or hardware. For example, the computing device 120 can include a device processor, a device storage component and a device interface component. The device processor can generate a request for access to resources available remotely from the computing device 120 and/or a request to change an access level for a user, a group of users or a resource.

Resources available to the computing device 120 can include one or more software applications and/or hardware components. These resources can be stored remotely from the computing device 120. These resources can be provided to the computing device 120 via the client interface component. The client interface component can provide a communication interface for receiving and/or transmitting data with external components and/or other devices (e.g., via a USB connection, serial port connection, parallel port connection, HDMI port connection, radio-frequency connection, Bluetooth™ connection, a wireless connection, a mobile network connection, audio data connection, video data connection and any other data connections).

The software applications can include computer programs that can provide functionality of the computing device 120 or enable functionality of the computing device 120. The software applications can also operate with or enable the hardware components to provide functionality to the computing device 120. For example, the software applications can include, without limitations, e-mail client applications, messaging applications, social networking applications and/or gaming applications.

The hardware components can include any physical components or devices that can be available for use by the computing device 120. For example, the hardware components can include a storage component (e.g., a hard disk drive, a random-access memory, and/or other computer data storage components), a navigation component (e.g., a Global Positioning System (GPS)), a multimedia component (e.g., a sound card, a video card, etc.), one or more user interface components (e.g., a touch screen, a keyboard, a display, etc.), and/or other components for providing additional functionalities to the computing device 120 (e.g., a motion detection module including a Gyroscope, etc.).

Generally, the control module 110 manages access to resources available remotely to one or more computing devices 120. For clarity, the control module 110 illustrated in FIG. 1 is provided as a computer server that is capable of network communication and also separate from the computing device 120. The control module 110 includes a control interface module 114 and a control storage module 116. It will be understood that the control module 110 can also be provided using one or more computer servers.

In some embodiments, the control module 110 can be provided as part of an emulation system with one or more emulation servers. The control module 110 can be provided within a server that is separate from the emulation servers in the emulation system.

The emulation system can imitate one or more computer products in an emulation session provided to computing devices 120. The computer products can be resources available to the computing device 120. The computer product can include a computer system, an operating environment, a software application, and/or one or more hardware and software components. The hardware components can include hardware devices such as a mobile device or a tablet computer. The software application can include computer programs. The emulation system can facilitate the emulation by translating and processing instructions received from the computing device 120 into a format compatible with the emulated computer product. By providing the control module 110 within the emulation system, the control module 110 can manage use and access of resources and the computer products provided within the emulation system.

In some embodiments, the control module 110 can be provided as a software component, such as a control application that can be installed within any computing device 120. The control module 110 can be downloaded from the network 130 or pre-installed on the computing device 120. The control module 110 can be a standalone application or part of another software application.

For example, the control module 110 can be installed onto the computing device 120. When the control module 110 is provided as a software component, the components of the control module 110 can be provided by the computing device 120. For example, the device processor can also operate as the control processor 112, the device interface component can also operate as the control interface module 114, and the device storage component can also operate as the control storage module 116.

Similarly, the control module 110 can be installed onto existing computer systems, such as an emulation server. The components of the control module 110 can therefore be provided by the computer systems. That is, a processor of the emulation server can also operate as the control processor 112, an interface component of the emulation server can also operate as the control interface module 114, and a storage component of the emulation server can also operate as the control storage module 116.

The control processor 112 can operate with one or more of the other components in the control module 110. For example, the control processor 112 can operate with the control interface module 114 for indicating whether access to a resource is granted or denied, or for receiving a request to change an access level. The control processor 112 can also operate to determine whether to grant access to a resource and/or whether to allow a change to an access level indicator for a resource or a user.

The control interface module 114 generally provides a communication interface for the control module 110. The control interface module 114 can include one or more communication ports and/or components for receiving data from and/or transmitting data to external components and/or devices. The communication ports can include a USB port, a serial port and/or one or more other peripheral ports. The control interface module 114 can provide communication via different communication protocols, such as for example via radio-frequency, wireless, and/or Bluetooth™ communication.

The control storage module 116 can store data related to management of resources available remotely from the computing device 120. For example, the control storage module 116 can store access level indicators for indicating different types of access available, identifiers for identifying users with access to the computing device 120 and possible access to a resource available to the computing device 120, and for each user and each resource, a corresponding access level indicator.

The control storage module 116 can be provided as a memory component within the control module 110. The control storage module 116 can also be in communication with one or more external storage devices for retrieving and storing data for the control module 110. Each external storage device can be provided as one or more databases and/or memory device.

The network 130 can include a local network, a mobile network and/or the internet.

Figure 2:
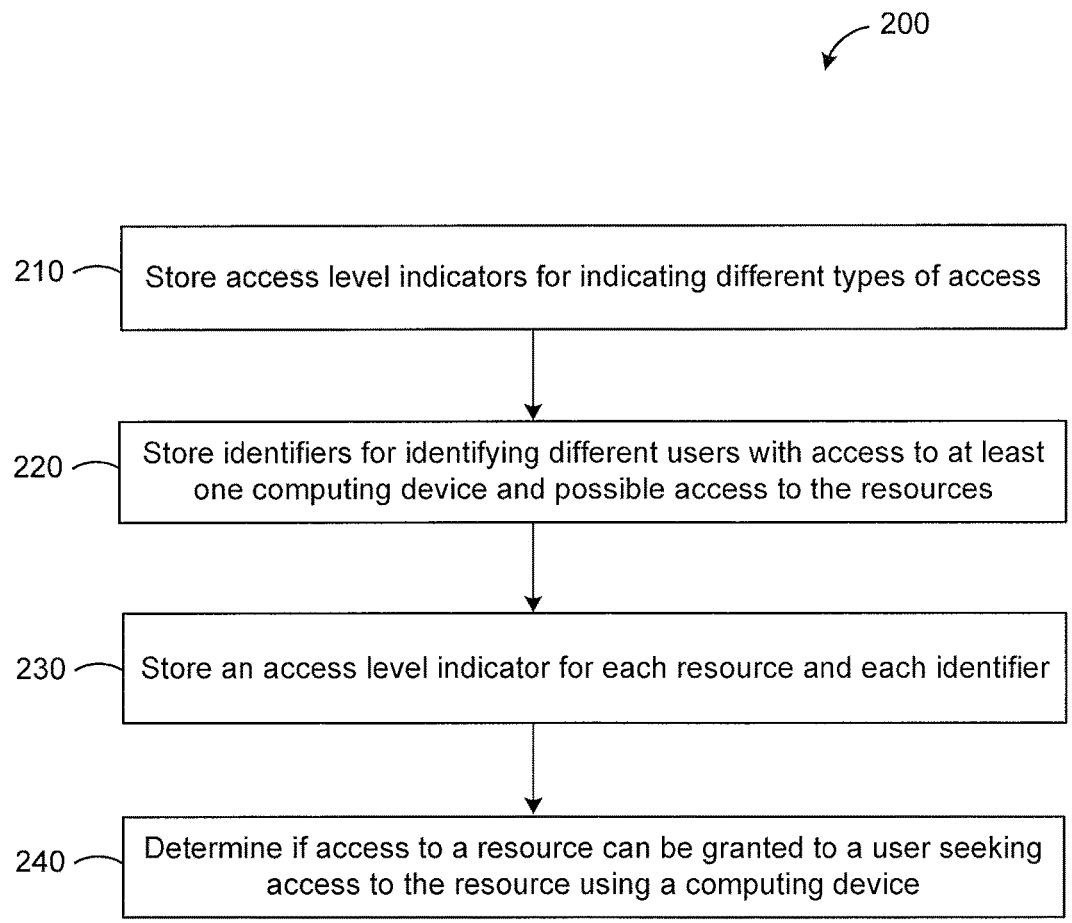
FIG. 2 is a flowchart diagram illustrating a process of managing access to remote resources, in accordance with an example embodiment.

FIG. 2 is a flowchart diagram 200 of a process of managing access to resources available remotely from the at least one computing device 120.

At step 210, the control module 110 stores in the control storage module 116 access level indicators for indicating different types of access.

Access level indicators generally indicate a type of access that is associated with a resource available to the computing device 120. For example, the access level indicators can include an access level indicator for an administrator and an access level indicator for a user.

At step 220, the control module 110 stores in the control storage module 116 identifiers for identifying different users having access to the at least one computing device and possible access to the resources.

The identifiers can include an administrator identifier for identifying the administrator and a user identifier for identifying the user.

At step 230, the control module 110, for each resource and for each identifier, stores in the control storage module 116 an access level indicator for that resource and that user.

Generally, an administrator can have a higher level of access to the resources available to the computing device 120 in order to maintain the computing device 120, such as to provide updates to software and/or hardware components, and to regulate use of the computing device 120 between one or more users. In some embodiments, the access level indicator for the administrator can indicate that the administrator has an unlimited access to each resource available to the computing device 120. The unlimited access provides the administrator with access to each resource without there being any restrictions on use of that resource and/or modifications of settings associated with that resource.

Instead, a regular user of the computing device 120 generally has a lower access level to the resources available to the computing device 120 than an administrator. The user of the computing device 120 can have access to resources required for regular day-to-day activities and unlikely has access to administrative settings for the computing device 120. For example, an assistant in an office setting can have access to word processing software resources but denied access to resources for modifying network firewall settings. In some embodiments, the access level indicator for the user can indicate that the user has a limited access to each resource available to the computing device 120. The limited access indicates that the user has access to the resource but with at least one restriction on how that resource can be used and/or modified.

The limited access associated with a user of the computing device 120 can include a time restricted access, an operation restricted access, and a user type restricted access.

The time restricted access can include a pre-determined time period restriction and a variable time period restriction. The pre-determined time period restriction can be designated by the administrator of the computing device 120. For example, a user of the computing device 120 can be restricted from using a gaming application during work hours (e.g., from 9 am to 5 pm) but the user can use the gaming application outside of work hours.

The variable time period restriction can instead include time restrictions that vary based, as indicated by the administrator of the computing device 120, on network availability or capacity, and/or an operational status of the computing device 120. For example, a user of the computing device 120 can be restricted from accessing a computer product in an emulation session provided by an emulation system when the local network of the computing device 120 is experiencing high traffic usage of resources within that local network. The user of the computing device 120 can similarly be restricted from accessing the emulation session if the operational status of the computing device 120 indicates that the computing device 120 is not ready or unavailable to conduct the emulation session.

The operation restricted access can grant the user access to the resource for conducting one or more predefined operations. That is, the operation restricted access limits how the user can use and/or modify the resource. For example, the operation restricted access can include a user interface restriction for a resource, a user display restriction for the computing device 120 and an output port restriction for the computing device 120.

The user interface restriction can include a restriction on whether a user can modify a user interface setting, such as a presentation of the user interface.

The user display restriction can include restrictions on whether a user can modify a display setting of the display of the computing device 120, such as a brightness level of the display and/or a contrast level of the display.

The output port restriction can include restrictions on whether a user can modify an output setting of the computing device 120, such as an output volume level of the computing device 120.

The user type restricted access grants the user access to the resource based on access defined for a particular user type. The user types can include a junior user, an intermediate user and a senior user. The junior user generally has a lowest level of access to the resource, the intermediate user generally has an intermediate level of access to the resource and a senior user generally has a highest level of access to the resource.

Continuing with the above example involving the gaming application, a junior user of the computing device 120 can be restricted from using the gaming application during work hours whereas a senior user of the computing device 120 can have access to the gaming application at any time.

It will be understood that each resource can be associated with one or more of the above described limited access.

At step 240, the control module 110 determines if access to a resource can be granted to a user seeking access to the resource using computing device 120.

As described above, the resource can include at least one software application and at least one hardware component. The software application can include one or more computer programs. The hardware component can include one or more hardware components. Computer products that are available to be provided in an emulation session can also be resources available remotely to the computing device 120.

Figure 3:
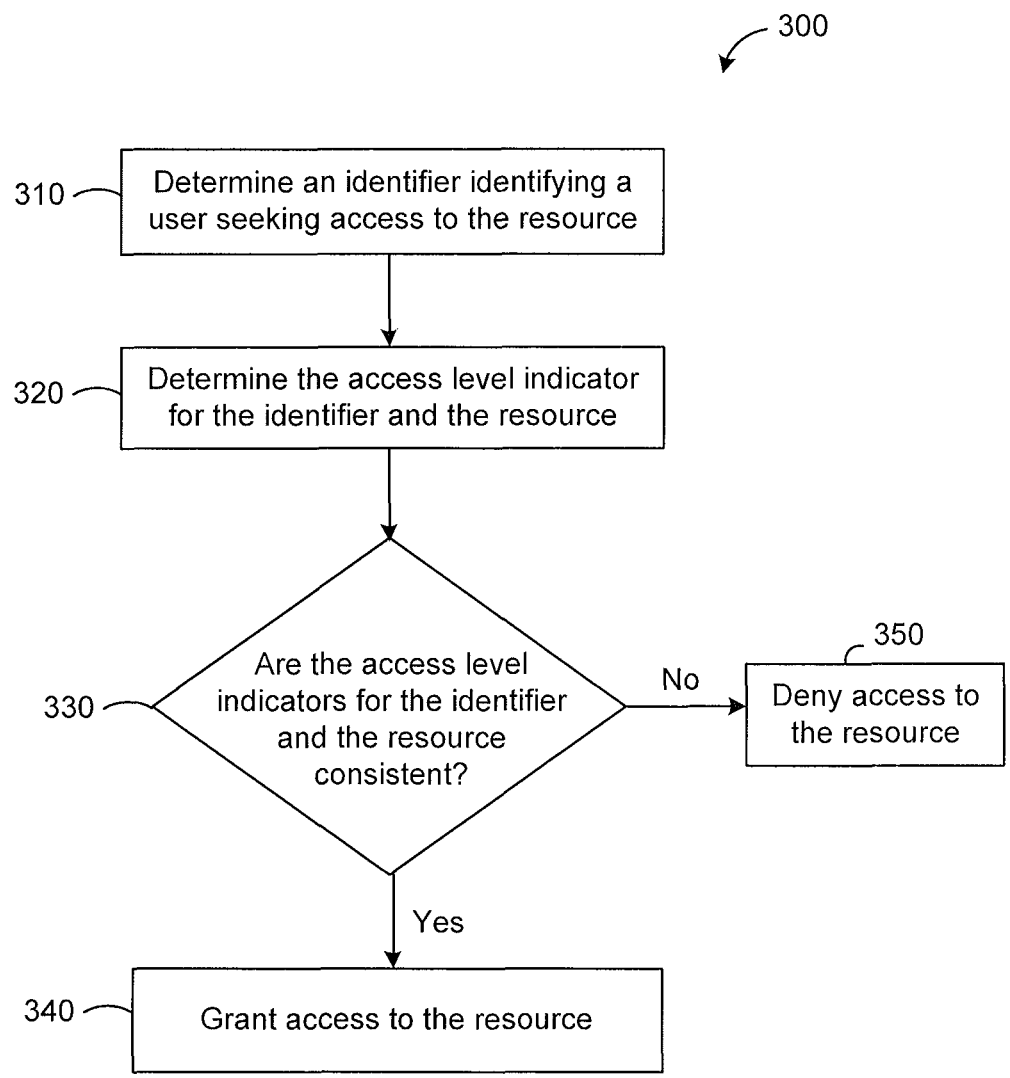
FIG. 3 is a flowchart diagram illustrating a process of determining whether to grant access to a resource, in accordance with an example embodiment.

Referring now to FIG. 3, which is a flowchart 300 of a process of determining if access to a resource can be granted.

At step 310, the control module 110 determines an identifier identifying a user seeking access to the resource.

In order to determine if access to a resource can be granted, the control module 110 determines an identifier to identify the user seeking access to the resource. As described above, the identifier can include an administrator identifier which identifies the user seeking access to the resource to be the administrator of the computing device 120 and a user identifier for identifying the user seeking access to the resource to be a user of the computing device 120.

At step 320, the control module 110 determines the access level indicator for the identifier and the resource.

Each identifier and each resource in the control storage module 116 is associated with an access level indicator, and therefore, the control module 110 can determine, based on the determined identifier and the resource, the access level indicator associated with the identifier and the access level indicator associated with the resource.

At step 330, the control module 110 determines if the access level indicator for the identifier is consistent with the access level indicator for the resource.

The control module 110 can determine if the access being sought by the user can be granted by comparing the access level indicator determined for the identifier of the user seeking access to the resource and the access level indicator associated with the resource. If the control module 110 determines that the access level indicator of each of the identifier and the resource is consistent, the control module 110 can grant access to the resource to the user seeking the access (at step 340). However, if the control module 110 determines that the access level indicator of each of the identifier and the resource is not consistent, the control module 110 can deny or refuse access to the resource to the user seeking access (at step 350).

In some embodiments, the control module 110 can receive a request from the computing device 120 to establish an emulation session of a resource, such as a computer product. The request can include a requested computer product identifier for identifying the computer product being requested to be emulated. The control module 110 can then determine an access level indicator for the computer product based on the requested computer product identifier provided in the request.

In some embodiments, the control module 110 can receive a request to change an access level indicator for an identifier and a resource. The request can include a requestor identifier corresponding to an identifier stored in the control storage module 116.

To determine whether to permit the request to change the access level indicator, the control module 110 can determine if the requestor identifier is the administrator identifier indicating that the request is provided from an administrator of the computing device 120. As described above, the administrator generally has a higher level of access than a regular user of the computing device 120. If the control module 110 determines that the requestor identifier is the administrator identifier, the control module 110 can change the access level indicator for the identifier and the resource according to the received request. Otherwise, the access level indicator for the identifier and the resource is not changed.

When the control module 110 determines, at any time, that access to a resource is to be denied or that the requester identifier is not the administrator identifier, the control module 110 can generate a response indicating that the request has been denied, or a denied access response. The denied access response can include redirecting a display of the computing device 120 to a predetermined user interface, such as a desktop display of the computing device 120, terminating the resource for which access is being requested and/or shutting down the computing device 120.

In some embodiments, the control module 110 can operate to read from and write to hardware and software information in a stack of the computing device 120, such as a mobile device. The control module 110 can access an operating system of the computing device 120 at layers that include the kernel, security layer, and user interface. The control module 110 can provide access to and retrieval of records of each access and the frequency of access to hardware by each user based on the kernel or other information. Similarly, the control module 110 can provide access to and retrieval of records of each access and the frequency of access to software from the kernel, user interface or other information. By providing the control module 110 with access to layers in the operating system of the computing device 120 such as the kernel, security layer, and user-interface, the control module 110 can access device records. For example, the control module 110 can access the device records during a software component signature check protocol conducted by the computing device 120 in order to modify the interaction with the stack.

In some embodiments, the control module 110 can provide use of the computing device 120 by multiple users, including an administrator. The control module 110 can provide user profiles at an application, system wide, and/or restricted system level.

In some embodiments, the control module 110 can generate a library data report of software or hardware use for desired time periods. The library data report can be stored on the computing device 120 for upload either manually, at set times, or by continuous real-time transfer.

A permissions table can be generated from library data report based on, for example, a list of software, hardware, or both, as accessed by the user within a selected time period.

Permission criteria can be established and assigned for designated software or hardware items to control associated settings such as authorized access, ability to change individual settings, etc., against the permission table. In some embodiments, the permission criteria can be applied more globally across a range of items on the computing device 120. Internal debugging or other reports or information can be monitored for specific messages that can then be summarized or used to trigger further action.

For example, a permission library can authorize a terminate command created by the control module 110 if control module 110 determines that access to a specific application is restricted. In that case, the control module 110 can respond by closing the application, redirecting the user to the user interface home page, turning off the computing device 120, and/or performing some other action that restricts the user's access. Specific applications may also be hidden by the control module 110 at the user interface level, based on the permission library.

In some embodiments, a detected touch of the display of the computing device 120 can generate a touch dispatch method that can reset the inactive counter. In some further embodiments, the detected touch can be modified to detect screen touch for specific applications.

In some embodiments, when a user tries to click the power button to shut off the screen, the control module 110 can detect such an action using record logs. Once the control module 110 locates a message indicating the screen was improperly shut off (e.g., a "goToSleepWithReason" message), the control module 110 can trigger a wake lock in order to force the screen back on.

In some embodiments, the control module 110 can enable use of the computing device 120 for a large user group (e.g., for retail display).

For example, background services of the computing device 120 can perform a set of actions per every designated time interval (e.g., every 200 milliseconds). These actions can include, for example, incrementing the inactiveTime variable if it hits a target time interval, such as 300 milliseconds (that is, 1 minute), a broadcast can be sent off to indicate that the home screen should display an inactivity warning. If the time interval reaches 600 milliseconds, or 2 minutes, the control module 110 can shut down the computing device 120.

In some embodiments, the control module 110 can control a brightness level of a display of the computing device 120. For example, if the brightness level of the computing device 120 is not at full brightness, the control module 110 forces the brightness level to the full brightness level. The control module 110 can prevent a user of the computing device 120 from manually altering the brightness level.

In some embodiments, the control module 110 can control a volume level of the computing device 120. For example, the control module 110 can check current volume levels (e.g., ringer, media, music, notification, etc.) against preset levels and reset if necessary.

In some embodiments, the control module 110 can control an active activity. For example, if the control module 110 determines that the active activity matches any of the restrictions, such as Settings, Package Installer, Task Manager, Market Downloader etc, then the control module 110 operates to direct the display of the computing device 120 to a home screen in order to prevent the user from continuing any further activity on the computing device 120.

In some embodiments, the control module 110 can provide other functionality to resources available at the computing device 120. For example, the control module 110 can require passwords for certain resources. As a result, the control module 110 enables a password protected administrator. Accordingly, the control module 110 provides for one or more user profiles to be generated for the computing device 120 in order to facilitate multiple user usage. For example, one user can access individual applications according to the login credentials (e.g., username and password or passwords) set up in the permissions table for each user, whereas another user can access these applications with different login credentials.

In some embodiments, the control module 110 can provide access and/or customization on individual user settings on a computing device 120 for multiple users. For example, the control module 110 can provide multiple user profiles for browsers and so, different users can load and maintain their own individual user profiles within the specific application.

In some embodiments, the control module 110 can generate new or modified "launcher" applications for use at the user interface. Each new launcher can be designated with its own respective username and password. When launched, the customization applies for the user across all designated settings and applications, similar to a user account profile provided on a computing device 120 that functions with more processing power, such as a laptop or desktop computer. This provides a more uniform user profile across designated unrestricted portions of the device.

In some embodiments, the control module 110 can monitor internal debugging or other reports or information or generate library data usage reports or other summaries. The control module 110 can transfer the reports from the computing device 120 to another device via a local address and/or a web address. For transfer to a web address, the control module 110 can provide the reports via a Uniform Resource Locator (URL). The control module 110 can format data provided in these reports in order to be compatible for access via a web browser. The control module 110 can provide additional security at the web browser, such as requiring additional passwords, etc. The control module 110 can provide transfer to a local address manually, at set times, or as a continuous transfer in real time.

The control module 110 can implement any of the transfer with a security feature that searches for one or receiving devices with software corresponding at the local address. When the control module 110 confirms an identity, the transfer to local device can begin, either by receipt of confirmation from that device, or automatically. For example, the local device can listen for incoming pairing connections from the computing device 120 and respond accordingly.

As a result, technical information such as crash reports, etc., can be more easily and completely accessed by the local device recipient for generating a response. Information may be provided by web to a software or hardware manufacturer, for example, or to a marketing or retail company for analytics.

For example, the control module 110 can send the report to a repair shop, retailer, etc. by placing the computing device 120 in close proximity to the local receiver, here the technical support, retailer, etc. The receiving technical support machine does not need to initiate the request, set up individual wired or wireless transfer, etc. The control module 110 can pre-load the option to provide this information automatically or on confirmation, based on established security information or not, when the devices are in a designated proximity.

The present invention has been described here by way of example only. Various modification and variations may be made to these exemplary embodiments without departing from the spirit and scope of the invention, which is limited only by the appended claims.

I claim:

1. A method of managing access to a plurality of resources available remotely from at least one computing device, the plurality of resources comprising at least one software application providing at least one computer program and at least one hardware component, the method comprising:

storing, in a memory in electronic communication with the at least one computing device, a plurality of access level indicators for indicating a plurality of different types of access, wherein each access level indicator in the plurality of access level indicators indicates a different type of access in the plurality of different types of access, each different type of access is a type of access to at least one resource in the plurality of resources;

storing in the memory a plurality of identifiers for identifying different users having access to the at least one computing device and possible access to the plurality of resources;

for each resource in the plurality of resources, storing in the memory a resource access level indicator for that resource, wherein the resource access level indicator is selected from the plurality of access level indicators;

for each identifier in the plurality of identifiers, storing in the memory a user access level indicator for that identifier, wherein the user access level indicator is selected from the plurality of access level indicators;

before granting access to a resource in the plurality of resources for a user seeking access to the resource using a computing device in the at least one computing device, operating at least one processor, the at least one processor being in electronic communication with the computing device, to:

determine an identifier identifying the user seeking access to the resource;

determine the user access level indicator stored in the memory for the identifier and the resource access level indicator for the resource, the resource access level indicator being determinable from memory without using the identifier, and the user access level indicator being determinable from memory without identifying the resource being accessed; and if the user access level indicator determined for the identifier is consistent with the resource access level indicator determined for the resource, grant access to the resource for operating the resource, otherwise, deny access to the resource, wherein each resource of the plurality of resources is one of the at least one software application and the at least one hardware component.

2. The method as defined in claim 1, wherein the at least one software application is a plurality of software applications.

3. The method as defined in claim 1, wherein the at least one hardware component is a plurality of hardware components.

4. The method as defined in claim 1, wherein the plurality of resources are stored remotely from the at least one computing device.

5. The method as defined in claim 1, wherein:

the plurality of resources comprises a plurality of computer products available to be provided in an emulation session;

the method further comprises:

receiving a request from the computing device to establish an emulation session of a computer product from the plurality of computer products, the request comprising a requested computer product identifier identifying the computer product being requested; and operating the at least one processor to determine the resource access level indicator in the memory for the computer product based on the requested computer product identifier.

6. The method as defined in claim 1 wherein:

the plurality of identifiers comprises an administrator identifier for identifying an administrator;

the method further comprises:

receiving a request to change the user access level indicator for an identifier and the resource access level indicator for a resource, wherein the request comprises a requestor identifier;

operating the processor to determine if the requestor identifier is the administrator identifier;
if the requestor identifier is the administrator identifier, changing the user access level indicator for the identifier and the resource access level indicator for the resource according to the request.

7. The method as defined in claim 6 further comprises:
in response to determining the requester identifier is not the administrator identifier, generating a denied access response indicating the request is denied, the denied access response includes at least one of redirecting a display of the computing device to a predetermined user interface and shutting down the computing device.

8. The method as defined in claim 1 wherein:
the plurality of identifiers comprises a user identifier for identifying a user, and an administrator identifier for identifying an administrator;
the user access level indicator for the administrator identifier provides an unlimited access to each resource in the plurality of resources, the unlimited access provides access to a resource without restrictions; and
the user access level indicator for the user identifier provides a limited access to each resource in the plurality of resources, the limited access provides access to a resource with at least one restriction.

9. The method as defined in claim 8, wherein the limited access includes at least one of a time restricted access granting the user access to the resource for a predefined time period, an operation restricted access granting the user access to the resource for conducting at least one predefined operation and a user type restricted access granting the user access to the resource as defined for each user type in a plurality of user types.

10. The method as defined in claim 9, wherein the operation restricted access includes at least one of a user interface restriction granting the user access to modify at least a portion of a user interface of the resource, a user display restriction granting the user access to modify at least one display setting of the computing device and an output port restriction granting the user access to modify at least one output setting of the computing device.

11. The method as defined in claim 1, wherein:
the user access level indicator is associated with a variable access threshold, the variable access threshold being a minimum availability level required at the at least one computing device in order for the at least one computing device to access the resource;
operating the at least one processor to determine the user access level indicator for the identifier comprises:
detecting an availability level of the at least one computing device, the availability level representing an operating capacity of the at least one computing device; and
determining whether the detected availability level satisfies the variable access threshold; and
operating the at least one processor to grant access to the resource comprises granting access to the resource in response to (i) determining the user access level indicator is consistent with the resource access level indicator and (ii) determining the detected availability level satisfies the variable access threshold.

12. The method as defined in claim 9, wherein the plurality of user types comprises a junior user having a lowest level of access to the resource, an intermediate user having an intermediate level of access to the resource and a senior user having a highest level of access to the resource.

13. The method as defined in claim 1, wherein the at least one processor is provided on the computing device.

14. The method as defined in claim 1, wherein the at least one processor is provided separate from the computing device.

15. The method as defined in claim 1, wherein operating the resource comprises operating the resource at a usage level associated with the resource access level indicator determined for that resource, each resource access level indicator being associated with a respective usage level.

16. A system of managing access to a plurality of resources available remotely from at least one computing device, the plurality of resources comprising at least one software application providing at least one computer program and at least one hardware component, the system comprising:
a controller in electronic communication with the at least one computing device, the controller comprising a control processor and a control memory having instructions stored thereon for configuring the control processor to:
store in the control memory a plurality of access level indicators for indicating a plurality of different types of access, wherein each access level indicator in the plurality of access level indicators indicates a different type of access in the plurality of different types of access, each different type of access is a type of access to at least one resource in the plurality of resources;
store in the control memory a plurality of identifiers for identifying different users having access to the at least one computing device and possible access to the plurality of resources;
for each resource in the plurality of resources, store in the control memory a resource access level indicator for that resource, wherein the resource access level indicator is selected from the plurality of access level indicators;
for each identifier in the plurality of identifiers, storing in the memory a user access level indicator for that identifier, wherein the user access level indicator is selected from the plurality of access level indicators; and
before granting access to a resource in the plurality of resources for a user seeking access to the resource using a computing device in the at least one computing device:
determine an identifier identifying the user seeking access to the resource;
determine the access level indicator stored in the control storage component for the identifier and the resource, the resource access level indicator being determinable from memory without using the identifier, and the user access level indicator being determinable from memory without identifying the resource being accessed; and
if the user access level indicator determined for the identifier is consistent with the resource access level indicator determined for the resource, grant access to the resource for operating the resource, otherwise, deny access to the resource,
wherein each resource of the plurality of resources is one of the at least one software application and the at least one hardware component.

17. The system as defined in claim 16, wherein the at least one software application is a plurality of software applications.

18. The system as defined in claim 16, wherein the at least one hardware component is a plurality of hardware components.

19. The system as defined in claim 16, wherein the plurality of resources are stored remotely from the at least one computing device.

20. The system as defined in claim 16, wherein:
the plurality of resources comprises a plurality of computer products available to be provided in an emulation session;
the control processor is further configured to:
receive a request from the computing device to establish an emulation session of a computer product from the plurality of computer products, the request comprising a requested computer product identifier identifying the computer product being requested; and
operate the at least one processor to determine the resource access level indicator in the memory for the computer product based on the requested computer product identifier.

21. The system as defined in claim 16 wherein:
the plurality of identifiers comprises an administrator identifier for identifying an administrator;
the control processor is further configured to:
receive a request to change the user access level indicator for an identifier and the resource access level indicator for a resource, wherein the request comprises a requestor identifier;
operate the processor to determine if the requestor identifier is the administrator identifier;
if the requestor identifier is the administrator identifier, change the user access level indicator for the identifier and the resource access level indicator for the resource according to the request.

22. The system as defined in claim 21, wherein the control processor is further configured to:
in response to determining the requester identifier is not the administrator identifier, generate a denied access response indicating the request is denied, the denied access response includes at least one of redirecting a display of the computing device to a predetermined user interface and shutting down the computing device.

23. The system as defined in claim 16 wherein:
the plurality of identifiers comprises a user identifier for identifying a user, and an administrator identifier for identifying an administrator
the user access level indicator for the administrator identifier provides an unlimited access to each resource in the plurality of resources, the unlimited access provides access to a resource without restrictions; and
the user access level indicator for the user identifier provides a limited access to each resource in the plurality of resources, the limited access provides access to a resource with at least one restriction.

24. The system as defined in claim 23, wherein the limited access includes at least one of a time restricted access granting the user access to the resource for a predefined time period, an operation restricted access granting the user access to the resource for conducting at least one predefined operation and a user type restricted access granting the user access to the resource as defined for each user type in a plurality of user types.

25. The system as defined in claim 24, wherein the operation restricted access includes at least one of a user interface restriction granting the user access to modify at least a portion of a user interface of the resource, a user display restriction granting the user access to modify at least one display setting of the computing device and an output port restriction granting the user access to modify at least one output setting of the computing device.

26. The system as defined in claim 16, wherein:
the user access level indicator is associated with a variable access threshold, the variable access threshold being a minimum availability level required at the at least one computing device in order for the at least one computing device to access the resource;
the control processor is further configured to:
detect an availability level of the at least one computing device, the availability level representing an operating capacity of the at least one computing device; and
determine whether the detected availability level satisfies the variable access threshold; and
grant access to the resource in response to (i) determining the user access level indicator is consistent with the resource access level indicator and (ii) determining the detected availability level satisfies the variable access threshold.

27. The system as defined in claim 24, wherein the plurality of user types comprises a junior user having a lowest level of access to the resource, an intermediate user having an intermediate level of access to the resource and a senior user having a highest level of access to the resource.

28. The system as defined in claim 16, wherein the controller is provided on the computing device.

29. The system as defined in claim 16, wherein the controller is provided separate from the computing device.

30. The system as defined in claim 16, wherein operating the resource comprises operating the resource at a usage level associated with the resource access level indicator determined for that resource, each resource access level indicator being associated with a respective usage level.

* * * * *